(12) United States Patent
Nishida

(10) Patent No.: US 7,684,163 B2
(45) Date of Patent: Mar. 23, 2010

(54) ABNORMAL CONNECTION DETECTING CIRCUIT AND DRIVING DEVICE INCLUDING THE SAME

(75) Inventor: Junji Nishida, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 545 days.

(21) Appl. No.: 11/517,962

(22) Filed: Sep. 7, 2006

(65) Prior Publication Data
US 2007/0058312 A1    Mar. 15, 2007

(30) Foreign Application Priority Data
Sep. 15, 2005    (JP)    ............... 2005-268355

(51) Int. Cl.
H02H 3/08    (2006.01)
H02H 9/02    (2006.01)
(52) U.S. Cl. .................... 361/93.1; 361/93.7
(58) Field of Classification Search ............. 361/93.1, 361/93.7
See application file for complete search history.

(56) References Cited
U.S. PATENT DOCUMENTS

| | | | | |
|---|---|---|---|---|
| 4,204,201 A | * | 5/1980 | Williams et al. ............ 340/521 |
| 4,831,483 A | * | 5/1989 | Matsumura et al. .......... 361/98 |
| 6,625,522 B2 | * | 9/2003 | Sakurai et al. .............. 701/1 |
| 6,804,096 B2 | * | 10/2004 | Nagata ...................... 361/78 |
| 7,102,359 B2 | * | 9/2006 | Allen et al. ................. 324/522 |

FOREIGN PATENT DOCUMENTS

| | | |
|---|---|---|
| JP | 2004-86257 | 3/2004 |
| JP | 2005-35797 | 2/2005 |

* cited by examiner

*Primary Examiner*—Stephen W Jackson
*Assistant Examiner*—Zeev Kitov
(74) *Attorney, Agent, or Firm*—Cooper & Dunham, LLP

(57) ABSTRACT

A device for detecting an abnormal connection status of a load connected between a first connection terminal and a second connection terminal is disclosed. An abnormal connection detecting circuit includes a first transistor configured to receive a predetermined first bias voltage, and output a current according to a voltage of the second connection terminal; and an abnormality detector configured to detect the current output from the first transistor, and detect the abnormal connection status based on the detected current.

26 Claims, 7 Drawing Sheets

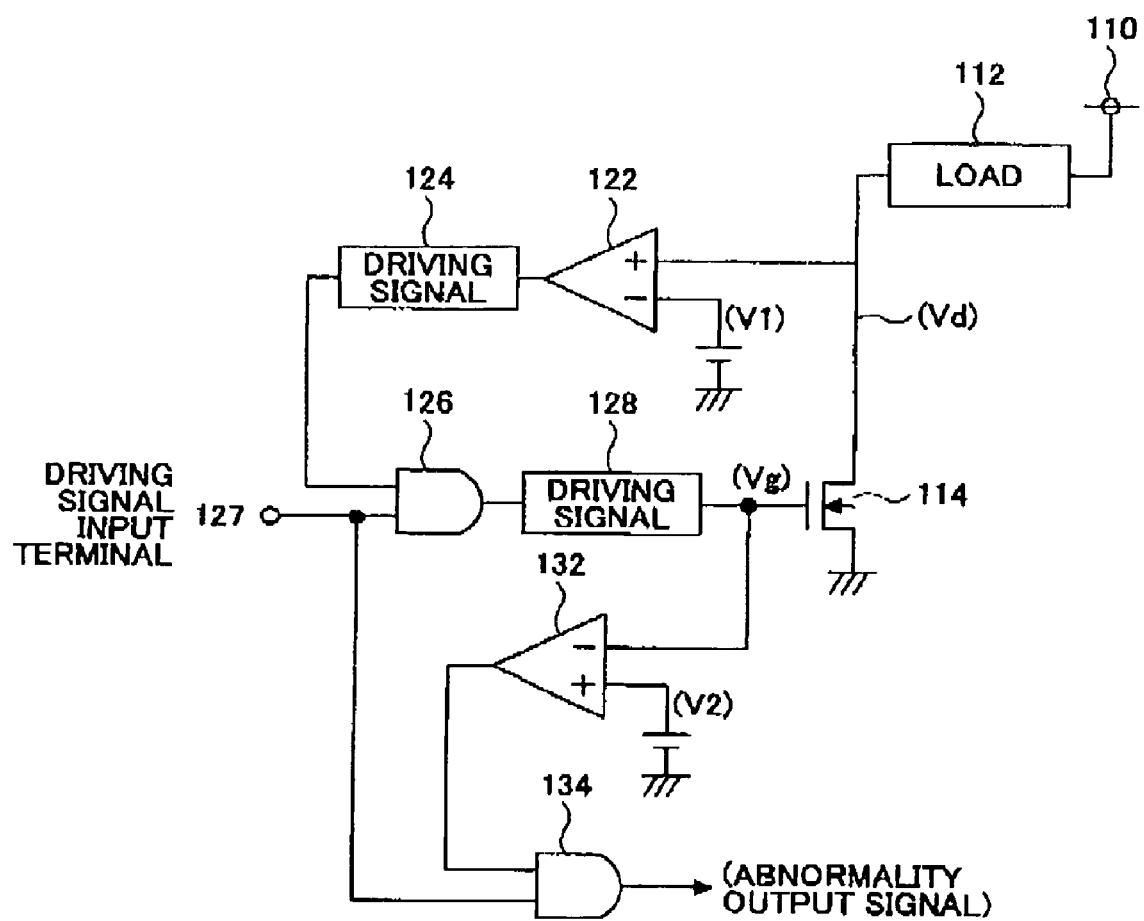

ABNORMAL CONNECTION DETECTING CIRCUIT AND DRIVING DEVICE INCLUDING THE SAME

BACKGROUND

1. Technical Field

This disclosure relates generally to abnormal connection detecting circuits for detecting abnormal connections between loads and output terminals, which circuits are provided in driving devices that supply currents to the loads. More particularly, the disclosure relates to an abnormal connection detecting circuit for detecting an open status in which a load is not connected to an output terminal, or a short-circuit status in which the output terminal is connected to ground, and a driving device including the same.

2. Description of the Related Art

Abnormal connection detecting circuits are used for responding to abnormalities, such as an open status and a short-circuit status. An open status is when a load is not connected to an output terminal through which power is supplied to the load. A short-circuit status is when the output terminal is connected to ground. When these abnormalities occur, the abnormal connection detecting circuit stops power from being supplied to the load, or displays a warning about the abnormality.

FIG. 7 is a circuit diagram of an example of a conventional abnormal connection detecting circuit (see, for example, Patent Document 1).

In FIG. 7, a high-level signal is input to an AND circuit 126 via a driving signal input terminal 127, and a drain voltage Vd of an NMOS transistor 114 is greater than or equal to a reference voltage V1. In this case, an output terminal of the AND circuit 126 becomes high-level, and a gate voltage Vg of the NMOS transistor 114 increases, so that the NMOS transistor 114 is switched on, and an electrical current is supplied to a load 112.

When the drain voltage Vd of the NMOS transistor 114 is less than the reference voltage V1, the output terminal of the AND circuit 126 becomes low-level, and the gate voltage Vg of the NMOS transistor 114 decreases, so that the NMOS transistor 114 is switched off, and electric supply to the load 112 is stopped. When a power line of the load 112 is disconnected, the drain voltage Vd of the NMOS transistor 114 becomes substantially 0 V, and therefore, the gate voltage Vg continues to decrease. When a signal input to the driving signal input terminal 127 is high-level, and the gate voltage Vg of the NMOS transistor 114 is less than or equal to a reference voltage V2, a comparator 132 outputs a high-level signal, so that an output terminal of an AND circuit 134 becomes high-level. Accordingly, a predetermined abnormality output signal indicating an abnormal status is output.

Patent Document 1: Japanese Laid-Open Patent Application No. 2004-86257

However, the drain voltage Vd is an extremely low voltage when the NMOS transistor 114 is switched on. Therefore, in the method of comparing the drain voltage Vd and the reference voltage V1, a comparison is made between microscopic voltages of near 0 V, which requires a high-precision comparator. Further, it is difficult to configure a comparator for detecting voltages of near 0 V with a single power source, which leads to high costs. Moreover, when a load current is low, or when a transistor with a low saturation voltage is used, the drain voltage Vd decreases even further, which makes it difficult to detect abnormalities with high precision.

SUMMARY

In an aspect of this disclosure, there is provided an abnormal connection detecting circuit and a driving device including an abnormal connection detecting circuit that can precisely detect an abnormal connection of a load with a simple circuit.

In an embodiment of this disclosure, there is provided an abnormal connection detecting circuit for detecting an abnormal connection status of a load connected between a first connection terminal to which a predetermined positive source voltage is applied, and a second connection terminal connected to a predetermined negative source voltage via a first constant-current source that generates and supplies a predetermined first constant-current, the abnormal connection detecting circuit including a first transistor configured to receive a predetermined first bias voltage at a first control electrode, and output a current according to a voltage of the second connection terminal; and an abnormality detector configured to detect the current output from the first transistor, and detect the abnormal connection status based on the detected current, the abnormal connection status being an open status in which the load is not connected to both the first connection terminal and the second connection terminal, or a short-circuit status in which the second connection terminal is short-circuited to the negative source voltage of the second connection terminal.

In another embodiment of the present invention provides this disclosure, there is provided a driving device for driving a load, the driving device including an abnormal connection detecting circuit for detecting an abnormal connection status of the load connected between a first connection terminal to which a predetermined positive source voltage is applied, and a second connection terminal connected to a predetermined negative source voltage via a first constant-current source that generates and supplies a predetermined first constant-current, the abnormal connection detecting circuit including a first transistor configured to receive a predetermined first bias voltage at a first control electrode, and output a current according to a voltage of the second connection terminal; and an abnormality detector configured to detect the current output from the first transistor, and detect the abnormal connection status based on the detected current, the abnormal connection status being an open status in which the load is not connected to both the first connection terminal and the second connection terminal, or a short-circuit status in which the second connection terminal is short-circuited to the negative source voltage of the second connection terminal.

In another embodiment of this disclosure, there is provided a driving device for driving a plurality of loads, the driving device including a plurality of abnormal connection detecting circuits for detecting an abnormal connection status of each of the loads, each load being connected between a first connection terminal to which a predetermined positive source voltage is applied and a corresponding second connection terminal connected to a predetermined negative source voltage via a corresponding constant-current source that generates and supplies a predetermined constant-current, each of the abnormal connection detecting circuits including a first transistor configured to receive a predetermined first bias voltage at a first control electrode, and output a current according to a voltage of the corresponding second connection terminal; and an abnormality detector configured to detect the current output from the first transistor, and detect the abnormal connection status based on the detected current, the abnormal connection status being an open status in which the load is not connected to both the first connection terminal and the corresponding second connection terminal, or a short-circuit status in which the corresponding second connection terminal is short-circuited to the negative source voltage of the second connection terminal.

Thus, a voltage of a connection terminal connected to a load eon be amplified with a simple circuit, and an abnormal connection of the load can be definitely detected with higher precision.

BRIEF DESCRIPTION OF THE DRAWINGS

Other aspects, features and advantages will become more apparent from the following detailed description when read in conjunction with the accompanying drawings, in which:

FIG. 7 is a circuit diagram of an example of a conventional abnormal connection detecting circuit.

DETAILED DESCRIPTION OF THE PREFERRED EMBODIMENTS

A description is given, with reference to the accompanying drawings, of an embodiment of the present invention.

First Embodiment

Figure 1:
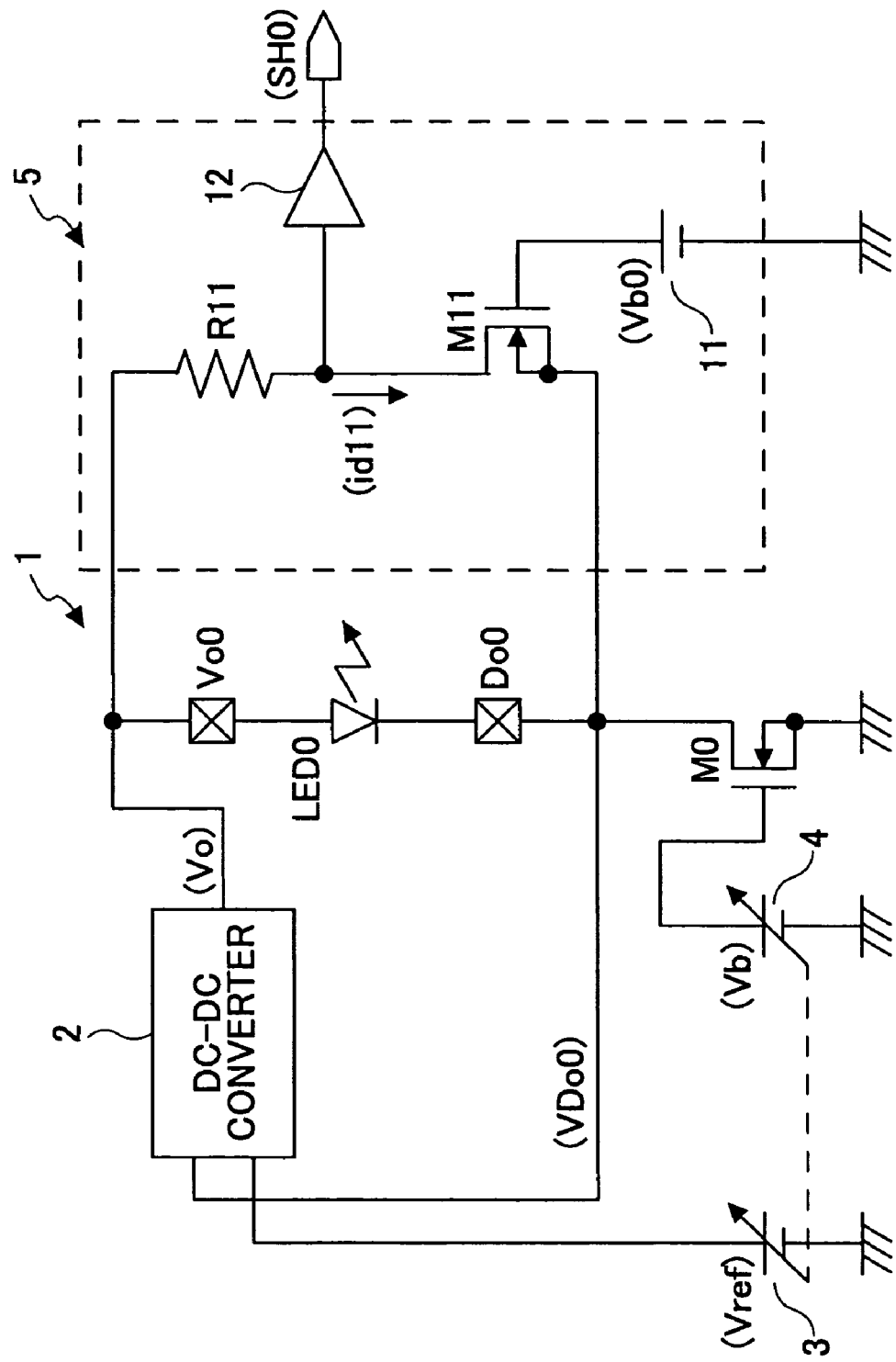
FIG. 1 is a circuit diagram of a driving device including an abnormal connection detecting circuit according to a first embodiment of the present invention.

FIG. 1 is a circuit diagram of a driving device including an abnormal connection detecting circuit according to a first embodiment of the present invention.

In FIG. 1, a driving device 1 operates by supplying an electrical current to a light-emitting diode LED 0, serving as a load connected between connection terminals Vo0 and Do0. The anode of the light-emitting diode LED 0 is connected to the connection terminal Vo0, and the cathode of the light-emitting diode LED 0 is connected to the connection terminal Do0. The connection terminal Vo0 serves as a first connection terminal, and the connection terminal Do0 serves as a second connection terminal.

The driving device 1 includes a step-up type DC-DC converter 2 serving as a constant voltage circuit for supplying power to the light-emitting diode LED 0; a reference voltage generating circuit 3 that generates and outputs a reference voltage Vref for designating a drive current of the light-emitting diode LED 0; a first bias voltage generating circuit 4 that generates and outputs a bias voltage Vb proportional to the reference voltage Vref; a drive transistor M0 that includes an NMOS transistor serving as a power source to which the bias voltage Vb is input via a gate thereof; and an abnormal connection detecting circuit 5 that detects an abnormal connection of the light-emitting diode LED 0. The driving device 1 can be integrated onto a single IC.

The abnormal connection detecting circuit 5 includes a second bias voltage generating circuit 11 that generates and outputs a predetermined bias voltage Vb0, an NMOS transistor M11, a buffer 12, and a resistance R11. The NMOS transistor M11 serves as a first transistor; the resistance R11 and the buffer 12 serve as an abnormality detector, where the resistance R11 serves as a current-voltage conversion circuit and the buffer 12 serves as a binarizing circuit. The bias voltage Vb0 serves as a first bias voltage.

The abnormal connection detecting circuit 5 detects whether the light-emitting diode LED 0 is normally connected to the connection terminals Vo0 and Do0, and whether the connection terminal Do0 is short-circuited to ground (predetermined negative source voltage). When the abnormal connection detecting circuit 5 detects that the light-emitting diode LED 0 is not normally connected to one or both of the connection terminals Vo0, Do0, or that the connection terminal Do0 is short-circuited to ground, the abnormal connection detecting circuit 5 outputs a predetermined abnormal connection detection signal SH0.

The reference voltage Vref and a voltage VDo0 are input to the DC-DC converter 2, the voltage VDo0 being a voltage of the connection terminal Do0. The DC-DC converter 2 adjusts an output voltage Vo so that the voltage VDo0 is equal to the reference voltage Vref. The output voltage Vo of the DC-DC converter 2 is applied to one end of the connection terminal Vo0 and one end of the resistance R11, and the drive transistor MO is connected between the connection terminal Do0 and ground. The bias voltage Vb is input to the gate of the drive transistor MO. As described above, the reference voltage Vref and the bias voltage Vb are in a proportional relationship. Accordingly, even if the drive current of the light-emitting diode LED 0 increases/decreases, the drive transistor M0 constantly operates in a saturated condition. The NMOS transistor M11 is connected between the other end of the resistance R11 and the connection terminal Do0, and the bias voltage Vb0 is input to a gate of the NMOS transistor M11. An input terminal of the buffer 12 is connected to a junction of the resistance R11 and a drain of the NMOS transistor M11. The buffer 12 outputs the abnormal connection detection signal SH0. The abnormal connection detection signal SH0 is used for switching on/off the step-up type DC-DC converter 2, displaying a warning, etc.

In the above-described structure, the DC-DC converter 2 operates to apply the output voltage Vo to the anode of the light-emitting diode LED 0, in a condition where the light-emitting diode LED 0 is normally connected to the connection terminals Vo0 and Do0, and the connection terminal Do0 is not short-circuited to ground. Accordingly, the drive transistor M0 is switched on, because the bias voltage Vb is applied to the gate of the drive transistor M0. As a result, the light-emitting diode LED 0 receives power, and emits light. The DC-DC converter 2 controls the output voltage Vo so that the voltage VDo0 is equal to the reference voltage Vref, the voltage VDo0 being a drain voltage of the drive transistor M0. Accordingly, the current flowing to the light-emitting diode LED 0 is controlled by a current value determined by the bias voltage Vb applied to the gate of the drive transistor M0, and the voltage VDo0 that is the drain voltage of the drive transistor M0.

When the drain voltage VDo0 of the drive transistor M0 is generated, a source voltage of the NMOS transistor M11 rises by an amount corresponding to the generated voltage. The bias voltage Vb0 is input to the gate voltage of the NMOS transistor M11, and therefore, the gate-source voltage of the NMOS transistor M11 decreases, and a drain current id11 of the NMOS transistor M11 decreases. Accordingly, a voltage drop across of the resistance R11 is mitigated, and the drain voltage of the NMOS transistor M11 rises. The voltage is output from the buffer 12, and when the light-emitting diode LED 0 is normally connected, a high-level abnormal connection detection signal SHO is output from the buffer 12.

In an open status, where the light-emitting diode LED 0 is not connected to one or both of the connection terminals Vo0, Do0, the drain voltage VDo0 of the drive transistor M0 becomes substantially 0 V. Thus, the gate-source voltage of the NMOS transistor M11 becomes substantially equal to the bias voltage Vb0, and the drain current id11 of the NMOS transistor M11 increases significantly, by a greater extent compared to a case where the light-emitting diode LED 0 is normally connected. Accordingly, the voltage drop across the resistance R11 increases by a greater extent, so that the drain voltage of the NMOS transistor M11 decreases, and a low-level abnormal connection detection signal SHO is output from the buffer 12.

The drain current of the NMOS transistor M11 is proportional to the square of a voltage variation of the gate-source voltage. Therefore, instead of simply detecting the drain voltage VDo0 of the drive transistor M0, an abnormal connection can be detected more sensitively by converting the drain voltage VDo0 into the drain current id11 of the NMOS transistor M11, in which case the drain voltage VDo0 corresponds to a variation of the gate voltage of the NMOS transistor M11, and performing a current-voltage conversion on the drain current id11 with the resistance R11.

When the connection terminal Do0 is short-circuited to ground, the voltage of the connection terminal Do0 is clamped to 0 V; therefore, the same operation is performed as in the open status where the light-emitting diode LED 0 is not connected, so that a low-level abnormal connection detection signal SH0 is output from the abnormal connection detecting circuit 5.

As described above, in the abnormal connection detecting circuit according the first embodiment, the drain voltage VDo0 of the drive transistor M0 is converted into the drain current id11 of the NMOS transistor M11, in which case the drain voltage VDo0 corresponds to a variation of the gate voltage of the NMOS transistor M11, and a current-voltage conversion is performed on the drain current id11 with the resistance R11, thereby improving the sensitivity in detecting an abnormal connection. Accordingly, an abnormal connection of a load can be precisely detected with a simple circuit. Specifically, it can be precisely detected as to whether the light-emitting diode LED 0 is normally connected to the connection terminals Vo0 and Do0, and whether the connection terminal Do0 is short-circuited to ground.

Second Embodiment

In the first embodiment, a through current may flow to the buffer 12 according to the input voltage of the buffer 12. Therefore, in a second embodiment according to the present invention, a current proportional to the drain current of the NMOS transistor M11 is generated, a current is obtained by subtracting a predetermined comparative current from the proportional current, the obtained current is converted into a voltage, and the voltage is input to the buffer 12. Accordingly, through currents are mitigated or prevented from flowing to the buffer 12.

Figure 2:
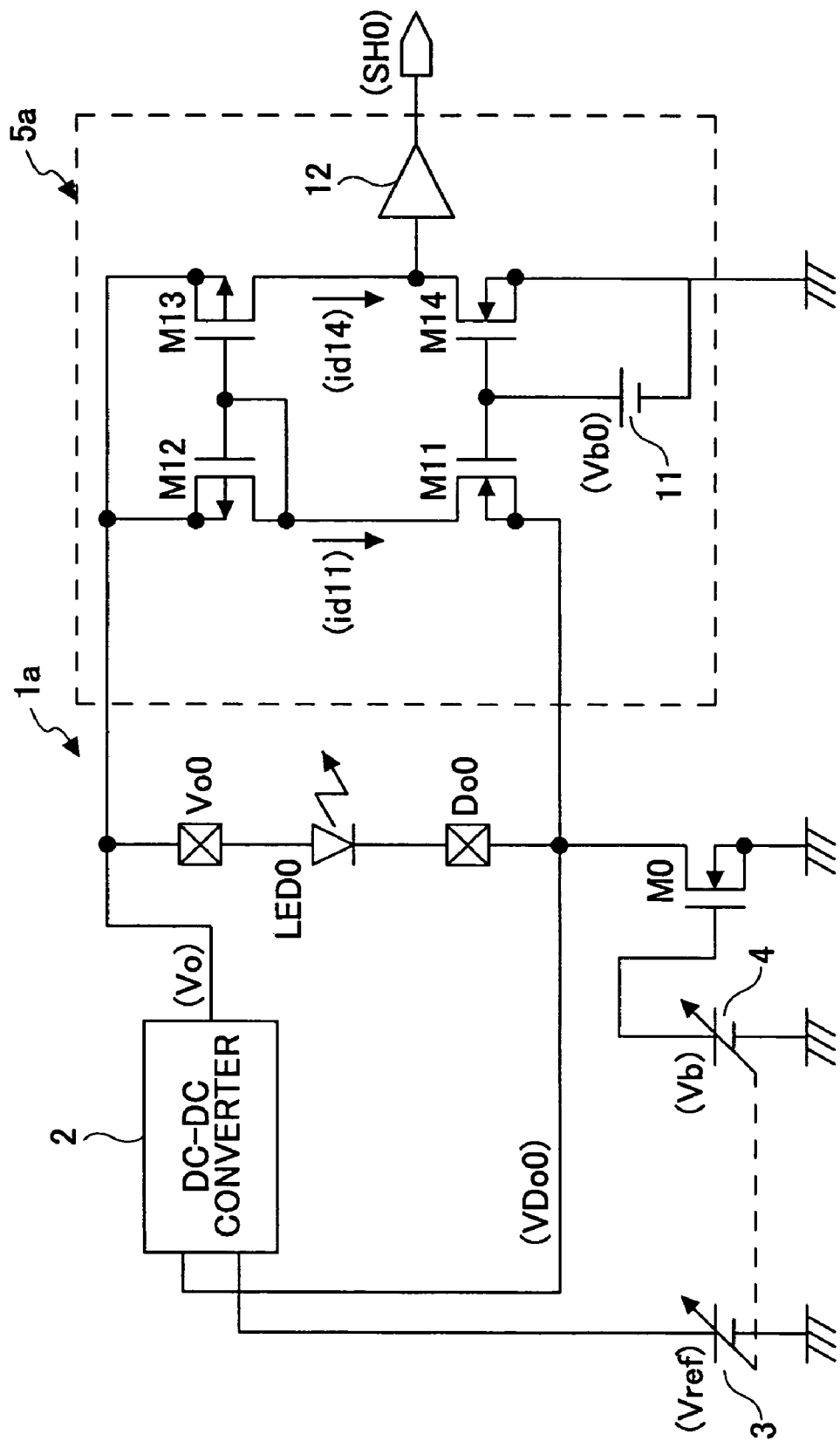
FIG. 2 is a circuit diagram of a driving device including an abnormal connection detecting circuit according to a second embodiment of the present invention.

FIG. 2 is a circuit diagram of a driving device including an abnormal connection detecting circuit according to a second embodiment of the present invention. In FIG. 2, elements corresponding to those in FIG. 1 are denoted by the same reference numbers, and are not further described; only differences between FIG. 1 and FIG. 2 are described herein.

The differences between FIG. 1 and FIG. 2 are that PMOS transistors M12, M13, and an NMOS transistor M14 are provided instead of the resistance R11. Accordingly, in the second embodiment, the abnormal connection detecting circuit 5 of the first embodiment is replaced by an abnormal connection detecting circuit 5a, and the driving device 1 of the first embodiment is replaced by a driving device 1a.

The driving device 1a includes the DC-DC converter 2, the reference voltage generating circuit 3, the first bias voltage generating circuit 4, the drive transistor M0, and the abnormal connection detecting circuit 5a that detects an abnormal connection of the light-emitting diode LED 0. The driving device 1a can be integrated onto a single IC.

The abnormal connection detecting circuit 5a includes the second bias voltage generating circuit 11; the NMOS transistors M11, M14; the PMOS transistors M12, M13 forming a current mirror circuit; and the buffer 12. The NMOS transistor M14, the PMOS transistors M12, M13, and the buffer 12 serve as a serve as an abnormality detector, where the NMOS transistor M14 and the PMOS transistors M12, M13 serve as a subtraction circuit, and the NMOS transistor M14 serves as a second transistor.

The abnormal connection detecting circuit 5a detects whether the light-emitting diode LED 0 is normally connected to the connection terminals Vo0 and Do0, and whether the connection terminal Do0 is short-circuited to ground. When the abnormal connection detecting circuit 5a detects that the light-emitting diode LED 0 is not normally connected to one or both of the connection terminals Vo0, Do0, or that the connection terminal Do0 is short-circuited to ground, the abnormal connection detecting circuit 5a outputs a predetermined abnormal connection detection signal SHO.

The output voltage Vo of the DC-DC converter 2 is applied to each of the sources of the connection terminal Vo0 and the PMOS transistors M12, M13. The gates of the PMOS transistors M12, M13 are connected, and the junction of the gates of the PMOS transistors M12, M13 is connected to the drain of the PMOS transistor M12. The drain of the PMOS transistor M12 is connected to the drain of the NMOS transistor M11, and the NMOS transistor M14 is connected between the drain of the PMOS transistor M13 and ground. The gates of the NMOS transistors M11 and M14 are connected, and the bias voltage Vb0 is input to the junction of the gates of the NMOS transistors M11 and M14. The junction of the drains of the PMOS transistor M13 and the NMOS transistor M14 is connected with the input terminal of the buffer 12.

In the above-described structure, similar to the first embodiment, when an abnormal connection has not occurred, the drain current id11 of the NMOS transistor M11 decreases. The drain current id11 turns back at the current mirror circuit formed by the PMOS transistors M12, M13, and then becomes a drain current id14 of the NMOS transistor M14. The same bias voltage Vb0 as that input to the NMOS transistor M11 is input to the gate of the NMOS transistor M14; the gate-source voltage of the NMOS transistor M14 increases to a level higher than that of the gate-source voltage of the NMOS transistor M11, by an amount corresponding to the drain voltage of the drive transistor M0. Accordingly, the NMOS transistor M14 decreases its drain voltage, so that a drain current greater than or equal to the drain current id11 of the NMOS transistor M11 flows from the NMOS transistor M14. The decreased drain voltage is input to the buffer 12, and when the connection is normal, a low-level abnormal connection detection signal SHO is output from the abnormal connection detecting circuit 5a.

In an open status, where the light-emitting diode LED 0 is not connected to one or both of the connection terminals Vo0, Do0, or when the connection terminal Do0 is short-circuited to ground, the drain voltage VDo0 of the drive transistor M0 becomes substantially 0 V. Further, the gate-source voltage of the NMOS transistor M11 and the gate-source voltage of the NMOS transistor M14 become substantially equal, at the bias voltage Vb0. Thus, the drain voltage of the NMOS transistor M14 becomes equal to a voltage after the output voltage Vo of the DC-DC converter 2 has decreased by an amount corresponding to the gate voltage of the PMOS transistor M12. This voltage is output from the buffer 12; therefore, in an open status where the light-emitting diode LED 0 is not connected to one or both of the connection terminals Vo0, Do0, or when the connection terminal Do0 is short-circuited to ground, a high-level abnormal connection detection signal SHO is output from the abnormal connection detecting circuit 5a.

Figure 3:
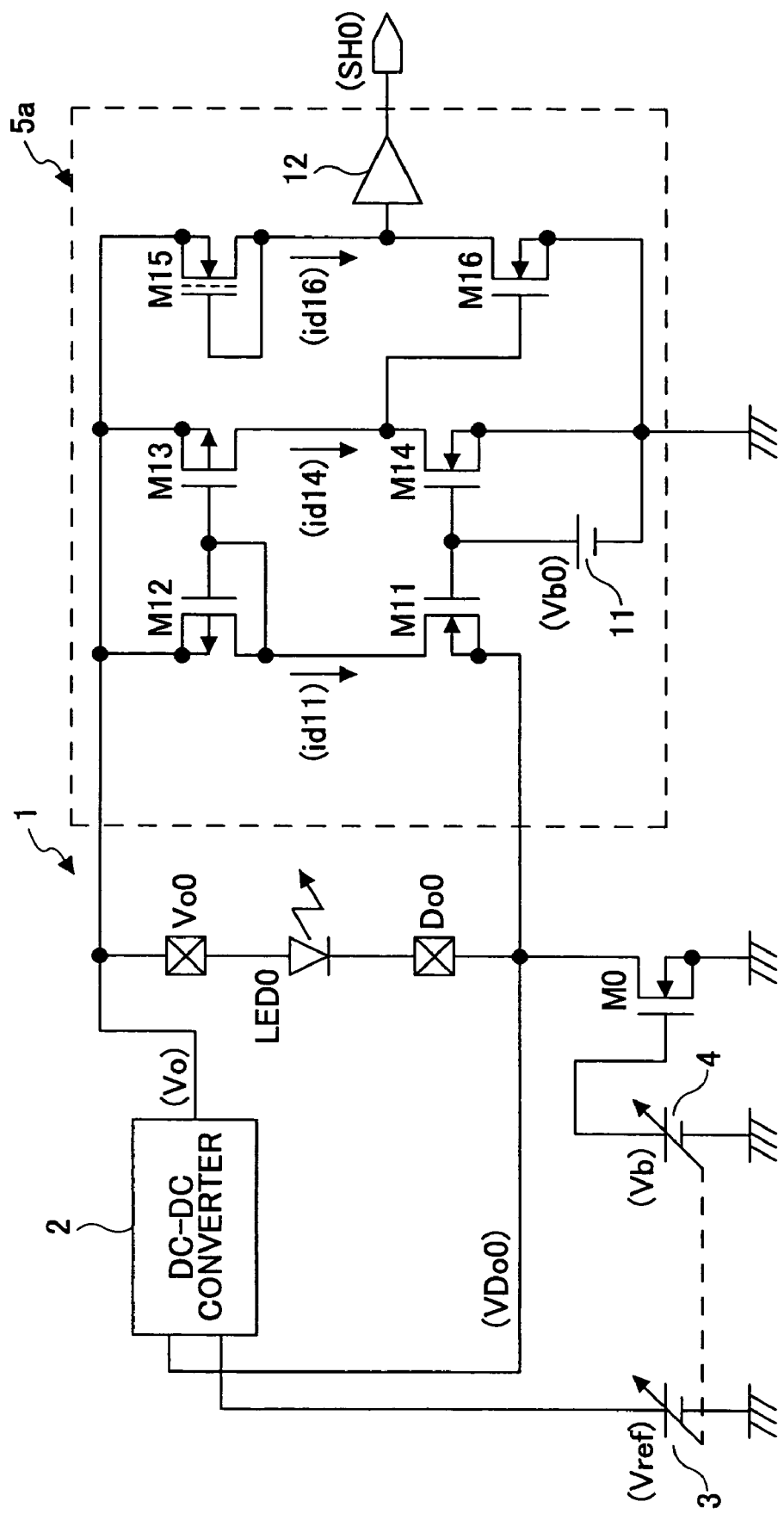
FIG. 3 is a circuit diagram of another example of the driving device including the abnormal connection detecting circuit according to the second embodiment of the present invention.

The logic level of the abnormal connection detection signal SHO output when an abnormal connection is detected in the circuit shown in FIG. 2 can be made to match that of the circuit shown in FIG. 1. This is achieved by connecting an inverter using a constant-current source between a junction of the PMOS transistor M13 and the NMOS transistor M14, and the input terminal of the buffer 12. Accordingly, the circuit shown in FIG. 2 becomes a circuit shown in FIG. 3. In FIG. 3, elements corresponding to those in FIG. 2 are denoted by the same reference numbers, and are not further described; only the difference between FIG. 2 and FIG. 3 are described herein.

The difference between FIG. 2 and FIG. 3 is that an inverter including a depletion-type NMOS transistor M15 and an NMOS transistor M16 is provided. The PMOS transistors and the NMOS transistors in this specification are enhancement-type transistors, unless specified otherwise.

In between the output voltage Vo of the DC-DC converter 2 and ground, the depletion-type NMOS transistor M15 and the NMOS transistor M16 are connected in series, and the junction of the NMOS transistors M15, M16 is connected to the input terminal of the buffer 12. The gate of the depletion-type NMOS transistor M15 is connected to its source, thereby configuring a constant-current source. The gate of the NMOS transistor M16 is connected to a junction of the PMOS transistor M13 and the NMOS transistor M14. The depletion-type NMOS transistor M15 and the NMOS transistor M16 form the inverter, in which the depletion-type NMOS transistor M15 serves as a constant-current load of the NMOS transistor M16. The inverter and the buffer 12 form a binarizing circuit.

In the circuit shown in FIG. 3, the signal levels of the abnormal connection detection signals SHO output from the abnormal connection detecting circuit 5a shown in FIG. 2 are inverted, so as to match the logic of the circuit shown in FIG. 1. Thus, in a normal status, a high-level abnormal connection detection signal SHO is output from the abnormal connection detecting circuit 5a, normal being the status where the circuit is not in an open status where the light-emitting diode LED 0 is not connected to one or both of the connection terminals Vo0, Do0, or when the connection terminal Do0 is not short-circuited to ground. Further, in an abnormal status, a low-level abnormal connection detection signal SHO is output from the abnormal connection detecting circuit 5a, abnormal being the status where the circuit is in an open status where the light-emitting diode LED 0 is not connected to one or both of the connection terminals Vo0, Do0, or when the connection terminal Do0 is short-circuited to ground. Moreover, in the circuit shown in FIG. 3, through currents are mitigated or prevented even more from flowing to the buffer 12 compared to the circuit shown in FIG. 2.

As described above, in the abnormal connection detecting circuit according the second embodiment, a current proportional to the drain current of the NMOS transistor M11 is generated, a current is obtained by subtracting a predetermined comparative current from the proportional current, the obtained current is converted into a voltage, and the voltage is input to the buffer 12. Accordingly, the same effects as those of the first embodiment can be achieved, and through currents are mitigated or prevented from flowing to the buffer 12.

Third Embodiment

In the second embodiment, the same bias voltage Vb0 is input to both gates of the NMOS transistors M11, M14; however, different voltages can be input to the gates of the NMOS transistors M11, M14, as in a third embodiment according to the present invention.

Figure 4:
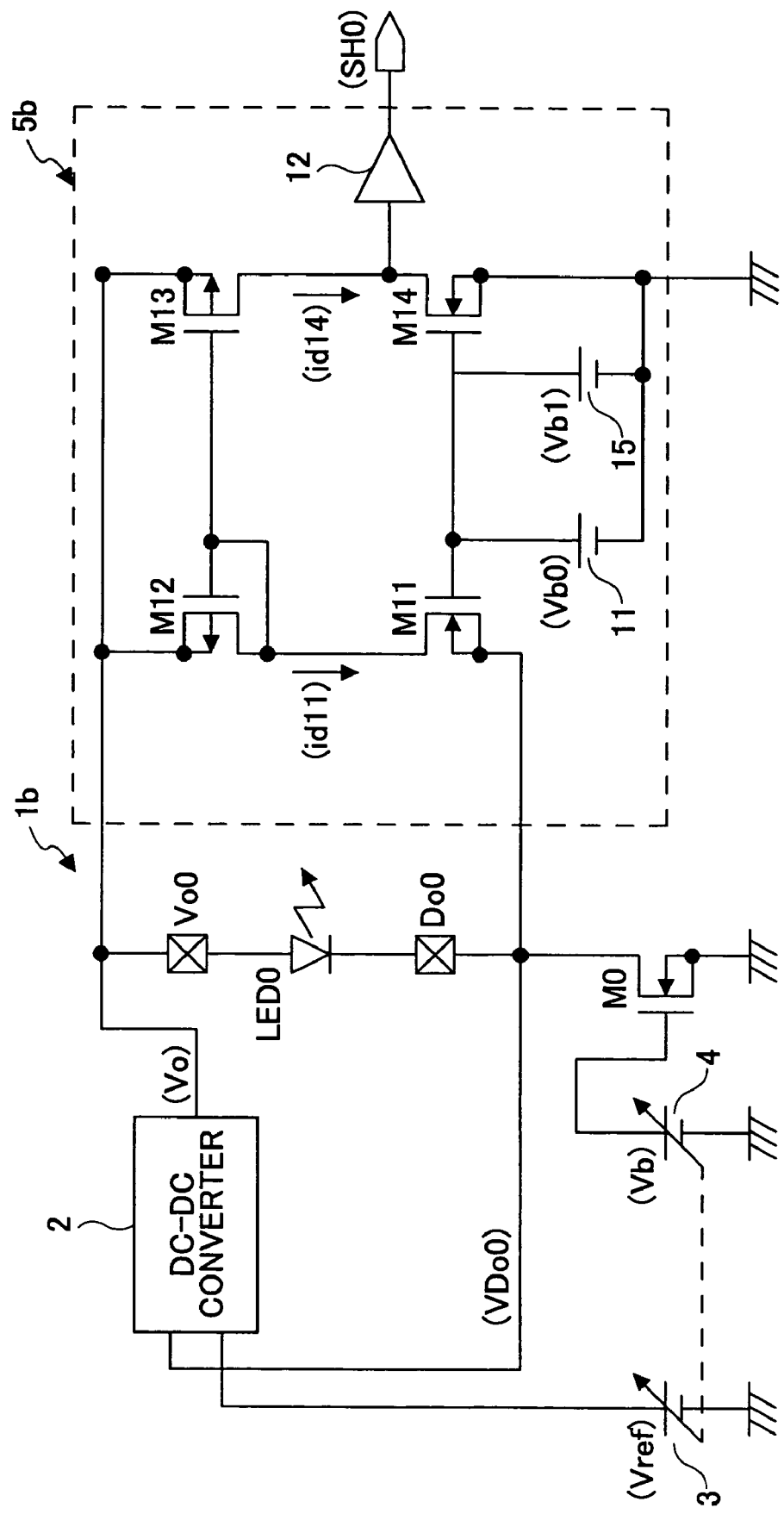
FIG. 4 is a circuit diagram of a driving device including an abnormal connection detecting circuit according to a third embodiment of the present invention.

FIG. 4 is a circuit diagram of a driving device including an abnormal connection detecting circuit according to the third embodiment of the present invention. In FIG. 4, elements corresponding to those in FIG. 2 are denoted by the same reference numbers, and are not further described; only the difference between FIG. 2 and FIG. 4 is described herein.

The difference between FIG. 2 and FIG. 4 is that a third bias voltage generating circuit 15 that generates a predetermined bias voltage Vb1 and outputs the bias voltage Vb1 to the gate of the NMOS transistor M14 is provided. Accordingly, in the third embodiment, the abnormal connection detecting circuit 5a of the second embodiment is replaced by an abnormal connection detecting circuit 5b, and the driving device 1a of the second embodiment is replaced by a driving device 1b.

In FIG. 4, the driving device 1b includes the DC-DC converter 2, the reference voltage generating circuit 3, the first bias voltage generating circuit 4, the drive transistor M0, and the abnormal connection detecting circuit 5b that detects an abnormal connection of the light-emitting diode LED 0. The driving device 1b can be integrated onto a single IC.

The abnormal connection detecting circuit 5b includes the second bias voltage generating circuit 11, the NMOS transistors M11, M14, the PMOS transistors M12, M13, the buffer 12, and the third bias voltage generating circuit 15 that generates and outputs the predetermined bias voltage Vb1. The bias voltage Vb1 serves as a second bias voltage. The abnormal connection detecting circuit 5b detects whether the light-emitting diode LED 0 is normally connected to the connection terminals Vo0 and Do0, and whether the connection terminal Do0 is short-circuited to ground. When the abnormal connection detecting circuit 5b detects that the light-emitting diode LED 0 is not normally connected to one or both of the connection terminals Vo0, Do0, or that the connection terminal Do0 is short-circuited to ground, the abnormal connection detecting circuit 5b outputs a predetermined abnormal connection detection signal SHO.

The bias voltage Vb0 is input to the gate of the NMOS transistor M11, and the bias voltage Vb1 is input to the gate of the NMOS transistor M14.

In the above-described structure, similar to the second embodiment, when an abnormal connection has not occurred, the drain current id11 of the NMOS transistor M11 decreases. The drain current id11 turns back at the current mirror circuit formed by the PMOS transistors M12, M13, and then becomes a drain current id14 of the NMOS transistor M14. The bias voltage Vb1 is input to the gate of the NMOS transistor M14, which voltage is different to that input to the NMOS transistor M11.

When fixed bias voltage values of the bias voltages Vb0, Vb1 are made to satisfy Vb0>Vb1, the gate-source voltage of the NMOS transistor M14 increases from the gate-source voltage of the NMOS transistor M11 by an amount corresponding to {VDo0−(Vb0−Vb1)}. Therefore, the drain voltage of the NMOS transistor M14 is made to be substantially equal to ground, so that a drain current greater than or equal to the drain current id11 of the NMOS transistor M11 flows from the NMOS transistor M14. This drain voltage, which is substantially equal to ground, is input to the buffer 12, and when the connection is normal, a low-level abnormal connection detection signal SHO is output from the abnormal connection detecting circuit 5b. The difference in fixed bias voltages (Vb0−Vb1) is made to be less than or equal to the drain voltage of the drive transistor M0.

In an open status, where the light-emitting diode LED 0 is not connected to one or both of the connection terminals Vo0, Do0, or when the connection terminal Do0 is short-circuited to ground, the drain voltage VDo0 of the drive transistor M0 becomes substantially 0 V. Thus, the gate-source voltage of the NMOS transistor M11 becomes substantially equal to the fixed bias voltage Vb0, and the gate-source voltage of the NMOS transistor M14 is equal to the fixed bias voltage Vb1. Because the fixed bias voltages satisfy Vb0>Vb1, the NMOS transistor M14 can only let a drain current of less than or equal to the drain current id11 of the NMOS transistor M11 flow. Thus, the drain voltage of the NMOS transistor M14 becomes close to the level of the output voltage Vo of the DC-DC converter 2. The drain voltage of the NMOS transistor M14 is input to the buffer 12; therefore, in an open status where the light-emitting diode LED 0 is not connected to one or both of the connection terminals Vo0, Do0, or when the connection terminal Do0 is short-circuited to ground, a high-level abnormal connection detection signal SHO is output from the abnormal connection detecting circuit 5b.

Figure 5:
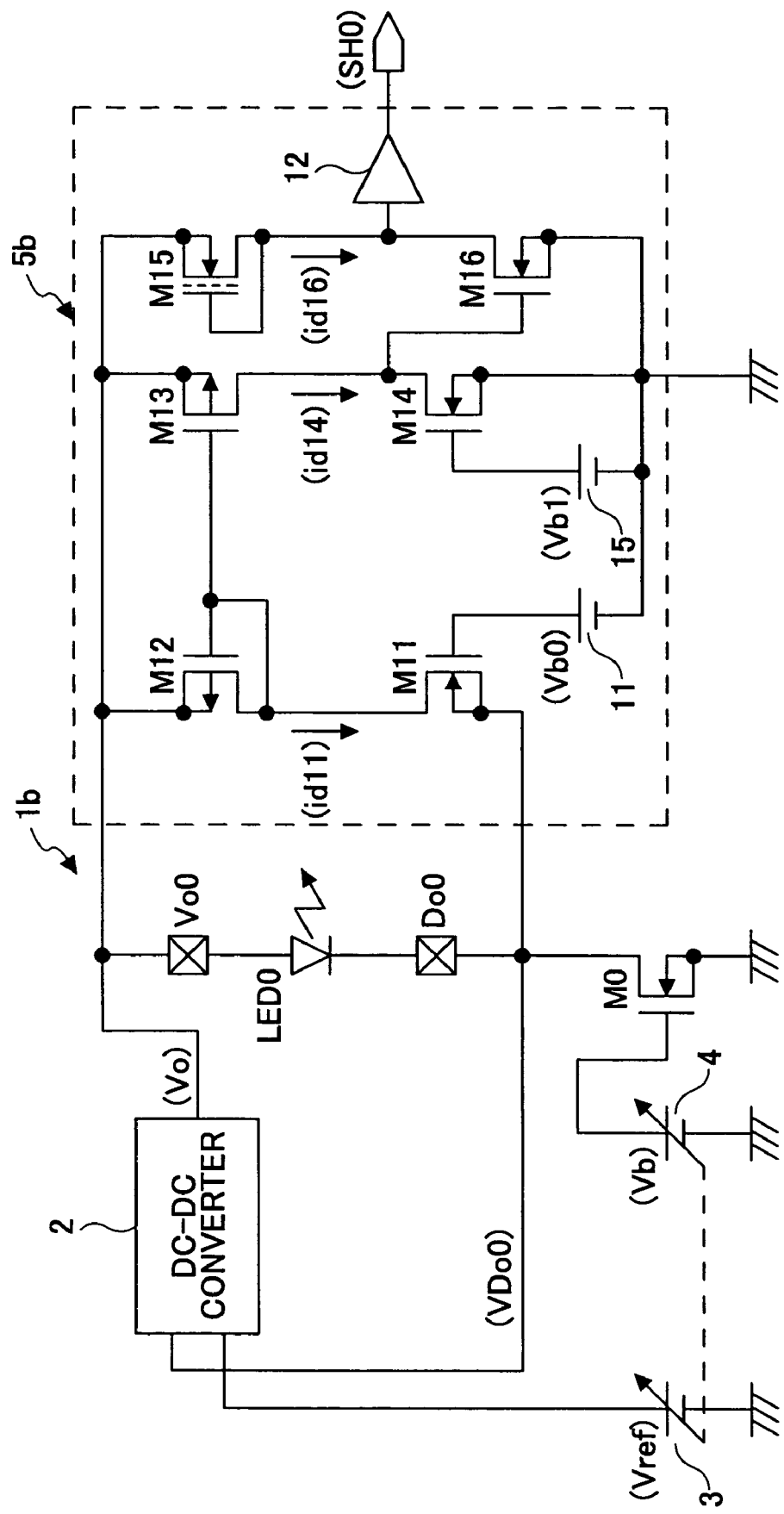
FIG. 5 is a circuit diagram of another example of the driving device including the abnormal connection detecting circuit according to the third embodiment of the present invention.

The logic level of the abnormal connection detection signal SHO output when an abnormal connection is detected in the circuit shown in FIG. 4 can be made to match that of the circuit shown in FIG. 1. This is achieved by connecting an inverter using a constant-current source between a junction of the PMOS transistor M13 and the NMOS transistor M14, and the input terminal of the buffer 12. Accordingly, the circuit shown in FIG. 4 becomes a circuit shown in FIG. 5. In FIG. 5, elements corresponding to those in FIG. 4 are denoted by the same reference numbers, and are not further described; only the difference between FIG. 4 and FIG. 5 are described herein.

The difference between FIG. 4 and FIG. 5 is that an inverter including a depletion-type NMOS transistor M15 and an NMOS transistor M16 is provided. The operations of the inverter including the depletion-type NMOS transistor M15 and the NMOS transistor M16 shown in FIG. 5 are the same as that described with reference to FIG. 3, and are not further described.

As described above, in the abnormal connection detecting circuit according the third embodiment, different bias voltages can be input to the gates of the NMOS transistors M11, M14. Accordingly, the same effects as those of the second embodiment can be achieved, and through currents are mitigated or prevented even more from flowing to the buffer 12.

Figure 6:
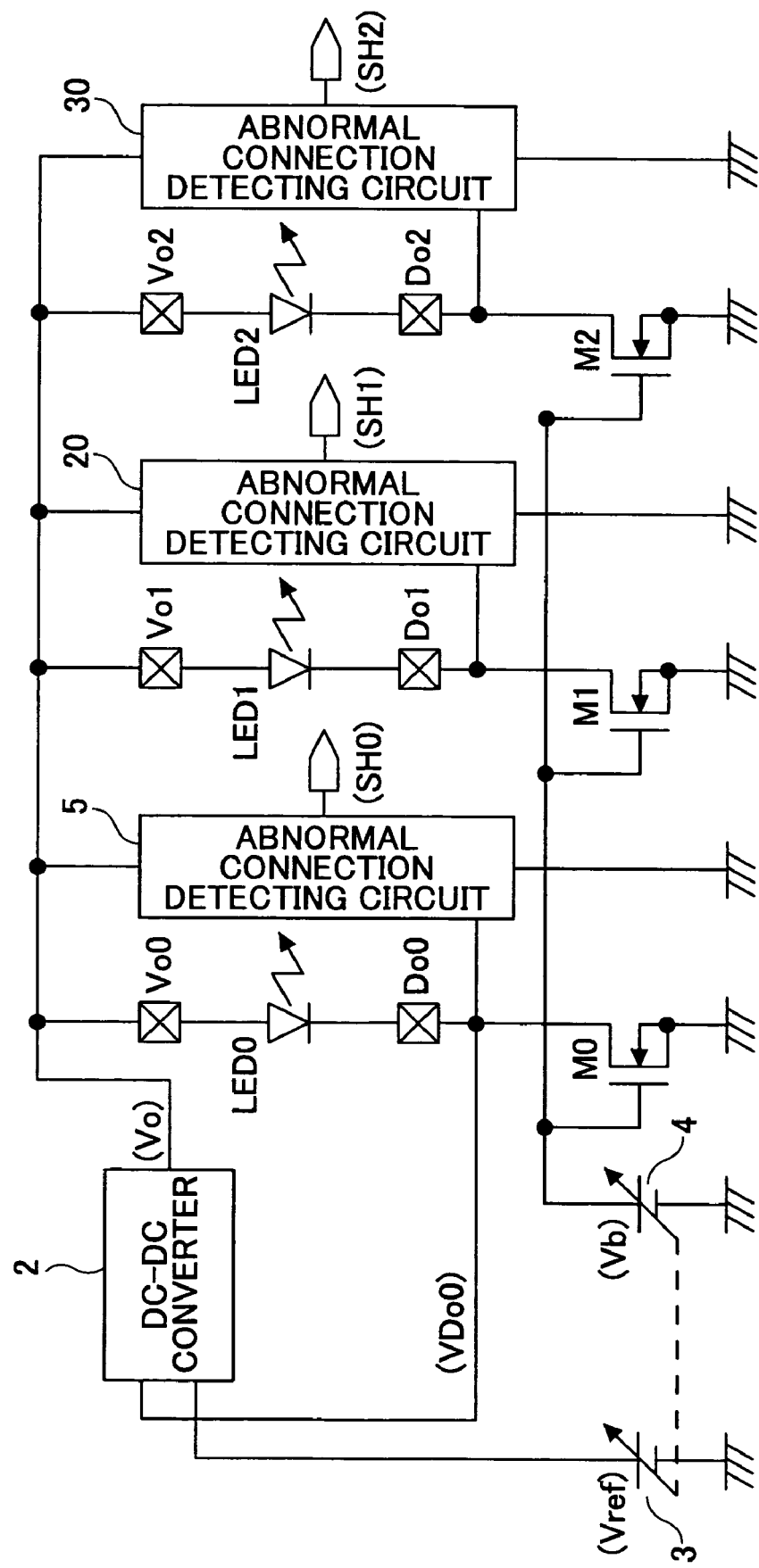
FIG. 6 is a circuit diagram of a circuit including the abnormal connection detecting circuits according to the first through third embodiments.

The first through third embodiments describe driving devices including a single light-emitting diode LED 0; however, the present invention is not limited thereto. Plural light-emitting diodes can be operated, as shown in FIG. 6. FIG. 6 is a circuit diagram of a circuit in which three light-emitting diodes are operated.

A driving device shown in FIG. 6 includes the DC-DC converter 2; drive transistors M0 through M2; a reference voltage Vref for designating drive currents of the light-emitting diodes LED 0 through LED 2; the first bias voltage generating circuit 4 that generates and outputs a bias voltage Vb proportional to the reference voltage Vref; and abnormal connection detecting circuits 5, 20, 30 that detect abnormal connections of connection terminals Vo0 through Vo2 and Do0 through Do2, respectively. The driving device shown in FIG. 6 can be integrated onto a single IC.

The DC-DC converter 2 adjusts an output voltage Vo so that the drain voltage VDo0 of the drive transistor M0 is equal to the reference voltage Vref. The gates of the drive transistors M0 through M2 are connected to each other, and the bias voltage Vb is input to junctions thereof. Accordingly, currents flowing through the light-emitting diodes LED 1 and LED 2 are made to have the same current values as that of the light-emitting diode LED 0. The reference voltage Vref and the bias voltage Vb are in a proportional relationship. Accordingly, even if the drive current of the light-emitting diode LED 0 increases/decreases, the drive transistor M0 constantly operates in a saturated condition. The abnormal connection detecting circuits 5, 20, 30 are all the same, and thus the circuits described in the first through third embodiments can be applied. One of the abnormal connection detecting circuits is provided for each of the pairs of the connection terminals Vo0 through Vo2 and Do0 through Do2, so as to detect whether the light-emitting diodes are normally connected to the corresponding connection terminals Vo0 through Vo2 and Do0 through Do2, or whether the connection terminals Do0 through Do2 are short-circuited to ground. The abnormal connection detecting circuits 5, 20, 30 output abnormal connection detection signals SHO through SH2, respectively, and the abnormal connection detection signals SHO through SH2 are used for switching on/off the DC-DC converter 2.

In the above description, the DC-DC converter 2 is a step-up type; however, the present invention is not limited to this example, and another type of constant voltage circuit can be used.

The present invention is not limited to the specifically disclosed embodiments, and variations and modifications may be made without departing from the scope of the present invention.

The present application is based on Japanese Priority Patent Application No. 2005-268355, filed on Sep. 15, 2005, the entire contents of which are hereby incorporated by reference.

What is claimed is:

1. An abnormal connection detecting circuit for detecting an abnormal connection status of a load, the abnormal connection detecting circuit comprising:

a first transistor configured to receive a predetermined first bias voltage at a first control electrode, and output a first current according to a voltage of a second connection terminal connected to a drain of the first; and an abnormality detector configured to detect the first current output from the first transistor, and detect the abnormal connection status based on the detected first current, the abnormal connection status being an open status in which the load is not connected to both the second connection terminal and a first connection terminal to which a predetermined positive source voltage is applied, the load being connected between said first connection terminal and said second connection terminal, or a short-circuit status in which the second connection terminal is short-circuited to the negative source voltage of the second connection terminal, wherein said abnormality detector and said first transistor are connected in series between said first connection terminal and said second connection terminal, with said abnormally detector being connected to said first connection terminal and to said first transistor, and said first transistor being connected to said abnormally detector and said second connection terminal.

2. The abnormal connection detecting circuit according to claim 1, wherein the first transistor outputs an increased amount of the current in response to a decrease in the voltage of the second connection terminal, and the abnormality detector outputs a predetermined signal in response to the current output from the first transistor reaching a threshold.

3. The abnormal connection detecting circuit according to claim 1, wherein the abnormality detector includes a current-voltage conversion circuit configured to convert the current output from the first transistor into a voltage, and a binarizing circuit configured to binarize the voltage converted from the current by the current-voltage conversion circuit, and generate the signal.

4. The abnormal connection detecting circuit according to claim 1, wherein the first transistor and the abnormality detector are integrated onto a single IC.

5. A driving device for driving a load, the driving device including:

an abnormal connection detecting circuit for detecting an abnormal connection status of the load connected between a first connection terminal to which a predetermined positive source voltage is applied, and a second connection terminal, the abnormal connection detecting circuit comprising:

a first transistor configured to receive a predetermined first bias voltage at a first control electrode, and output a first current according to a voltage of said second connection terminal; and an abnormality detector configured to detect the first current output from the first transistor, and detect the abnormal connection status based on the detected first current, the abnormal connection status being an open status in which the load is not connected to both the first connection terminal and the second connection terminal, or a short-circuit status in which the second connection terminal is short-circuited to the negative source voltage of the second connection terminal, wherein said abnormality detector and said first transistor are connected in series between said first connection terminal and said second connection terminal, with said abnormality detector being connected to said first connection terminal and to said first transistor, and said first transistor being connected to said abnormality detector and said second connection terminal.

6. A driving device for driving a plurality of loads, the driving device including:

a plurality of first connection terminals;

a plurality of second connection terminals; and a plurality of abnormal connection detecting circuits corresponding to the respective plurality of loads for detecting a respective abnormal connection status of the respective loads, each load being connected between a respective first connection terminal to which a predetermined positive source voltage is applied, and a respective second connection terminal, the plurality of abnormal connection detecting circuits comprising:

a plurality of respective first transistors, each first transistor being configured to receive a respective predetermined first bias voltage at a respective first control electrode, and output a respective first current according to a voltage of the respective second connection terminal, the respective second connection terminal being connected to a drain of the respective first transistor; and a plurality of respective abnormality detector configured to detect the respective first current output from the respective first transistor, and detect the abnormal connection status based on the respective detected first current, the respective abnormal connection status being an open status in which the respective load is not connected to both the respective first connection terminal and the corresponding second connection terminal, or a short-circuit status in which the respective second connection terminal is short-circuited to the respective negative source voltage of the respective second connection terminal, wherein said plurality of abnormality detectors and said plurality of first transistors are connected respectively in series between said respective first connection terminal and said respective second connection terminal, with said respective abnormality detector being connected to said respective first connection terminal and to said respective first transistor, and said respective first transistor being connected to said respective abnormality detector and said respective second connection terminal.

7. The driving device according to claim 5, wherein the first transistor outputs an increased amount of the current in response to a decrease in the voltage of the second connection terminal, and the abnormality detector outputs a predetermined signal in response to the current output from the first transistor reaching a threshold.

8. The driving device according to claim 5, wherein the abnormality detector includes a current-voltage conversion circuit configured to convert the current output from the first transistor into a voltage, and a binarizing circuit configured to binarize the voltage converted from the current by the current-voltage conversion circuit, and generate the signal.

9. The driving device according to claim 5, wherein the first transistor and the abnormality detector are integrated onto a single IC.

10. The abnormal connection detecting circuit of claim 1, wherein when the load is not connected to any of said first connection terminal and said second connection terminal, the voltage at said second connection terminal becomes substantially zero, a drain current of the first transistor increases, and a drain voltage of the first transistor decreases.

11. The abnormal connection detecting circuit of claim 1, wherein a DC-DC converter is connected to said first connection terminal and to said second connection terminal, and said DC-DC converter is configured to supply said predetermined positive source voltage to said first connection terminal.

12. The abnormal connection detecting circuit of claim 3, wherein said current-voltage conversion circuit comprises a first resistor connected between said first connection terminal and a drain of said first transistor, and said binarizing circuit is comprised of a buffer connected to a node between said first resistor and said first transistor.

13. The abnormal connection detecting circuit of claim 1, wherein the first transistor is an n-channel MOSFET.

14. The abnormal connection detecting device according to claim 1, in connection with the load.

15. The driving device according to claim 5, in combination with the load.

16. The driving device according to claim 6, in combination with the plurality of loads.

17. The abnormal connection detecting circuit according to claim 1, wherein
the abnormality detector includes
a subtraction circuit configured to subtract a predetermined second constant current from the current output from the first transistor, convert a current obtained by the subtraction into a voltage, and output the voltage converted from the current, and
a binarizing circuit configured to binarize the voltage output from subtraction circuit, and generate the signal.

18. The abnormal connection detecting circuit according to claim 1, wherein
the abnormality detector includes
a subtraction circuit configured to generate a current proportional to the current output from the first transistor, subtract a predetermined second constant-current from the generated proportional current, convert a current obtained by the subtraction into a voltage, and output the voltage converted from the current, and
a binarizing circuit configured to binarize the voltage output from subtraction circuit, and generate the signal.

19. The abnormal connection detecting circuit according to claim 18, wherein
the subtraction circuit includes
a second transistor serving as a second constant-current source configured to receive the predetermined first bias voltage at a second control electrode, and generate and output the predetermined second constant-current.

20. The abnormal connection detecting circuit according to claim 18, wherein
the subtraction circuit includes
a second transistor serving as a second constant-current source configured to receive a predetermined second bias voltage at a second control electrode, and generate and output the predetermined second constant-current.

21. The abnormal connection detecting circuit according to claim 18, wherein
the binarizing circuit includes
an inverter configured to use a third constant-current source, receive the voltage output from the subtraction circuit, and output a signal according to the received voltage, and
a buffer configured to receive the signal output from the inverter, and generate and output the signal according to the received signal.

22. The driving device according to claim 5, wherein
the abnormally detector includes
a subtraction circuit configured to subtract a predetermined second constant-current from the current output from the first transistor, convert a current obtained by the subtraction into a voltage, and output the voltage converted from the current, and
a binarizing circuit configured to binarize the voltage output from the subtraction circuit, and generate the signal.

23. The driving device according to claim 5, wherein
the abnormality detector includes
a subtraction circuit configured to generate a current proportional to the current output from the first transistor, subtract a predetermined second constant-current from the generated proportional current, convert a current obtained by the subtraction into a voltage, and output the voltage converted from the current, and
a binarizing circuit configured to binarize the voltage output from subtraction circuit, and generate the signal.

24. The driving device according to claim 23, wherein the subtraction circuit includes
a second transistor serving as a second constant-current source configured to receive the predetermined first bias voltage at a second control electrode, and generate and output the predetermined second constant-current.

25. The driving device according to claim 23, wherein
the subtraction circuit includes
a second transistor serving as a second constant-current source configured to receive a predetermined second bias voltage at a second control electrode, and generate and output the predetermined second constant-current.

26. The driving device according to claim 23, wherein
the binarizing circuit includes
an inverter configured to use a third constant-current source, receive the voltage output from the subtraction circuit, and output a signal according to the received voltage, and
a buffer configured to receive the signal output from the inverter, and generate and output the signal according to the received signal.

* * * * *